United States Patent [19]

Speakman

[11] Patent Number: 5,018,920

[45] Date of Patent: May 28, 1991

[54] INTERFERENCE FIT BOLT AND SLEEVE

[75] Inventor: Eugene R. Speakman, Fullerton, Calif.

[73] Assignee: McDonnell Douglas Corporation, Long Beach, Calif.

[21] Appl. No.: 466,125

[22] Filed: Jan. 16, 1990

Related U.S. Application Data

[62] Division of Ser. No. 298,936, Jan. 23, 1989, abandoned.

[51] Int. Cl.⁵ .......................... F16B 13/04; F16B 21/00
[52] U.S. Cl. .................................... 411/43; 411/339; 411/383
[58] Field of Search .................. 411/43, 338, 339, 360, 411/361, 383

[56] References Cited

U.S. PATENT DOCUMENTS 3,915,052 10/1975 Ruhl .................................... 411/361
4,850,771 7/1989 Hurd .................................... 411/43

*Primary Examiner*—Neill R. Wilson
*Attorney, Agent, or Firm*—Gregory A. Cone; John P. Scholl

[57] ABSTRACT

In this fastening system two or more layers of material are fastened together by inserting a hollow sleeved fastener such as a rivet or a bolt into the hole in a high interference fit to expand the hole radially. The sleeve is configured either as a collar and a straight shank or as an angled upper portion combined with a shank for counterbored applications. The intersections between either the collar and the shank or the angle portion and the staight shank are designed with an enlarged radius such that when the sleeve is expanded after the insertion of the fastener inside of it, this radius is expanded, which in turn stress coins the adjacent edge of the hole in the layers. This localized stress coining as well as the hoop stress in the hole surrounding the hole dramatically increases the fatigue strength of the fastened layers in a structure assembly.

1 Claim, 4 Drawing Sheets

INTERFERENCE FIT BOLT AND SLEEVE

This is a division, of application Ser. No. 298.936, filed 23, Jan. 1989, now abandoned.

BACKGROUND OF THE INVENTION

This invention relates to a method for installing sleeved fasteners though multiple layers to achieve a high interference fit of the sleeved fasteners within their respective holes in the layers. More particularly, this invention relates in one embodiment to a method for installing fasteners in which the sleeves for the fasteners are initially inserted in a sliding fit into the holes followed by a high interference fit forcing of the fastener into the sleeve. Still more particularly, this invention relates to a method for installing sleeve fasteners in which the sleeves have uniquely formed radii at specified edges in the holes to stress coin these edges when the fasteners are inserted in the interference fit within the sleeves.

Normal practice for fastening multiple layers together is to clamp up the layers, drill holes, and then insert some type of fastener into the holes and thereby secure the layers together. The fasteners are usually inserted in a net or sliding fit in the receiving holes in the layers. For many applications this will be sufficient. However, when the assembled structure is subjected to cyclic loading, the looseness of the fit of the fasteners within their holes will result in continual working of the fasteners within their holes. This in turn leads to fretting corrosion and fatigue failure of either the fastener or the surrounding region of the layers adjacent a particular hole.

However, it is known that the utilization of a high interference fit of the fastener of the hole can effectively prevent the majority of this fretting corrosion due to cyclic loading of the assembled structure. In many cases an oversized fastener will be driven directly into the receiving hole in the layers. In other cases the use of a sleeve which is slipped into the hole in a net or sliding fit followed by the drive-in of the oversized fastener is utilized. For these last systems, see for example U.S. Pat. No. 3,820,297 for an interference fit blind fastener and also U.S. Pat. No. 4,244,661 for a fastener means and joint for laminates, assigned to the assignee of this invention, McDonnell Douglas Corporation.

Nevertheless, there remains a need for a fastener system which combines the concept of interference fit sleeved fasteners with the added benefit of stress coining and total hole filling at the edges of the hole.

SUMMARY OF THE INVENTION

This is a method to secure together multiple layers of material by means of sleeved fasteners which are installed in a high interference fit. The holes formed in the layers can be either straight through, constant diameter holes formed perpendicular to the layers or they can be this same type of hole which has been additionally modified by counterboring, typically for usages with flush head fasteners.

In either case, the sleeve to be inserted into the hole will be configured so as to conform to the surface of the holes in the layers, be they straight-walled, counterbored or whatever In the first case the sleeve will be configured as a collared sleeve in which that portion of the sleeve which enters into the hole will be a hollow cylinder whose outside diameter is such that it may be inserted in a net or sliding fit into the hole. The sleeve is prevented from falling through the hole by the presence of a collar which overlaps onto the outer surface of the layer. The other end of the sleeve extends at least to the corresponding opposite outer surface of the other outer layer at the other side of the hole. At the intersection of the collar with the cylindrical portion of the sleeve is to be found a radiused junction. When the fastener is installed in the sleeve in the high interference fit, this radius will be radially expanded. This in turn will radius stress coin the edge of the hole adjacent this radius. The opposite end of the sleeve extending out through the over side of the layer will be radially expanded to a lesser extent by the expansion of the fastener as it exits the hole. This in turn will produce a similar radial stress coining of the edge of the hole adjacent the sleeve at this area. Indeed, if the fastener is a rivet, the upsetting of the rivet adjacent here will complete the radial stress coining of the edge of the hole of this region. If the fastener to be used is a bolt, however, a counterbored washer nut will be used to prevent clamp up upon the end of the protruding sleeve in this area.

For the second type of installation involving a counterbored hole, the enlarged radius on the sleeve is to be found at the intersection of the angled portion of the sleeve with the remaining cylindrical portion of the sleeve. In this situation the end of the counterbored portion of the sleeve will normally be designed to fit flush with the outer surface of the layer in which the counterbore has been formed. At the other end of the sleeve the cylindrical portion will extend at least to the edge of the hole at the outer surface of the opposite side of the layers. Once again, after the fastener is installed in the counterbored sleeve, the expansion of the sleeve against the adjacent regions of the layers will cause radial stress coining at the enlarged radius area of the counterbored sleeve. And also as before, at the far end of the sleeve as it extends through the far side of the layers opposite of the counterbore, the expansion of the oversized fastener as it is driven into and through the hole will cause a lesser radial stress coining in this region of the layers adjacent this portion of the sleeve. In the case where a rivet is utilized as a fastener, the upsetting of the end of the rivet opposite the counterbore will increase the radial stress coin effect on this side of the layers. If a bolt is to be used as a fastener, again a counterbored washer nut will be utilized to prevent clamp up on the end of a protruding sleeve. For both types of installation utilizing bolts or hi-hucks, the fasteners should have a tapered lead-in to facilitate entry of the fastener into the sleeve.

DETAILED DESCRIPTION OF THE DRAWINGS

DETAILED DESCRIPTION OF THE INVENTION

Figure 1:
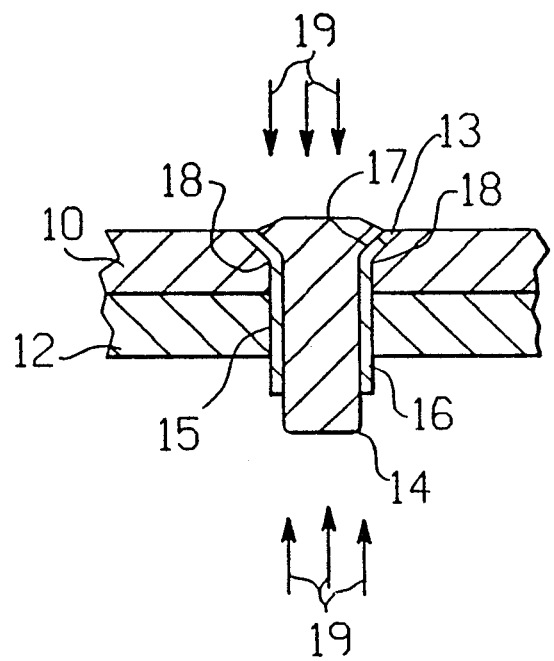
FIG. 1 is a cross sectional view of one embodiment of the invention utilizing a counterbored hole with a sleeved rivet in which the rivet assembly has been slip fitted into the hole in the laminates but has not yet been upset and thereby expanded into an interference fit.

As was discussed briefly above, ordinary fastener systems have clearance or net fit both before and after installation. However, this can be detrimental both to sealing and fatigue life for the fasteners and the structure within which they are installed. However, if interference fit fasteners are used both before and after installation, the fasteners will tend to broach and gall inside the hole during installation. One way to avoid this problem is to utilize a sleeve which is inserted into the hole in a sliding fit followed by the interference fit of the fastener into the sleeve.

In one embodiment of the system of this invention, a sleeve which is tailored to the hole is first slip fit into the hole to check the grip length of the sleeve within the hole. If the sleeve is properly sized for the hole, the fastener is then interference fit into the hole which then radially expands and prestresses the layers surrounding the hole. In another embodiment using the sleeved rivets, the rivet sleeve assembly is inserted as a unit into the hole in a slip fit with the final high interference fit resulting from the subsequent upsetting of the rivet in the hole. This in turn provides the advantages of sealing and decreasing the fatigue life of the fastener system and the surrounding structure. An added advantage is that should the fastener have to be removed, the fastener itself can be drilled out, and the sleeve is then easily removed without needing to redrill the hole and layers to a larger size. Another advantage is that during the stack up of the layers which are to be fastened together by the fastener system, the drilling or formation of the hole in the layers will often result in either differing hole diameters between the different layers or sometimes misaligned holes. By using a slip fit sleeve into such a hole, it is possible to select a size of sleeve which will slip into the hole and yet be able to receive a standard size fastener such as a hi-huck or a bolt for driving into the sleeve. Since the sleeves can be lower cost items than either the hi-hucks or the bolts, this lends important cost advantages to the system described herein. In other words, it is clearly easier to stock a variety of different sizes of sleeves having a uniform inside diameter than it is to stock a variety of sizes of fasteners to accommodate irregularities in hole sizes.

Additionally, the sleeve can be fabricated of corrosion resistant material such as stainless steel for use where corrosion may be a problem. This is often the case when a series of layers is fabricated from different materials which leads to galvanic corrosion between the layers and the fastener, typically made of aluminum. For example, it is common to form a stack of different layers of aluminum, steel, titanium mixtures and carbon epoxy composite structures.

As was discussed above, the use of sleeves with interference fit fasteners is not new. However, the advanced technology presented herein adds a carefully controlled oversized radius to the sleeve where it encounters abrupt angular changes at the edge of the hole. One such area for the oversized radius is at the junction between the collar and the straight wall of a sleeve for straight hole installations. Another example is an oversized radius provided at the intersection between the portion of the sleeve which matches a counterbore in a hole in the remaining portion of the sleeve which is a straight cylinder. When this oversized radius is expanded against the sharp edge of the receiving hole by the interference fit of the fastener within the sleeve, the sleeve produces a localized stress coining in that portion of the layers which has this sharp edge. This in turn significantly reduces the initiation of a fatigue crack which otherwise might occur at this sharp edge in the layers.

This system is also applicable for installation of sleeved rivets. Normally the rivet and sleeve will be slip fit into the hole as an assembly. The sleeve configuration is the same as that discussed above in conjunction with bolts, hi-hucks and similar threaded fasteners. The interference fit with its attendant advantages happens after the rivet is upset. The upsetting process causes sufficient longitudinal compression of the rivet to radially expand the rivet/sleeve assembly against the sides and edges of the hole to produce the same beneficial effects as resulted with the bolts.

The term hi-huck has been used to describe a particular type of fastener which may be used in this fastener system. These bolts have application in installations where composite layers are used since the composites do not tolerate well the driving impact forces normally used to install regular bolts into an interference fit in the hole.

The hi-huck fastener is a novel combination of the features of two pre-existing fasteners. The first is the hi-lock bolt which is a bolt that is designed for drive-in, interference fit applications. It is manufactured by the Hi-Shear Corporation. The second is the huck lock bolt made by the Huck Manufacturing Division of Federal Mogul Corporation. The huck bolt is shaped differently from normal bolts in that it has a reduced diameter serrated extension in addition to the head and shank portions found in normal bolts. It is installed by a special tool that grasps onto the serrated extension, pulls the huck bolt fully into the hole until the head of the bolt is seated, then swages down a collar onto the initial portion of the serrated section extending past the hole, then finally breaks off the remainder of the serrated end beyond the end of the swaged collar.

A more generic term for the hi huck fastener would be high interference threaded pull bolt. The special tool is also known as a huck bolt puller or a pull tool.

The hi-huck fastener disclosed herein is similar to the hi-lock bolt with the addition of the serrated extension from the huck bolt. Unlike the huck bolt, it is held in place by a counterbored washer nut rather than the permanent swaged collar. It is installed with a huck bolt puller. As with the huck bolt and the hi-lock bolt, the interference fit process desirably includes some form of lubrication to prevent galling upon drive-in of the bolt.

Figure 2:
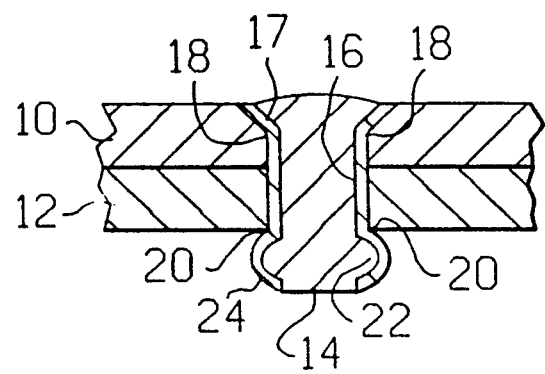
FIG. 2 is a cross sectional view of a succeeding stage of installation shown in FIG. 1 in which the rivet has now been upset.

Turning now to the drawing figures, FIG. 1 and FIG. 2 show in cross sectional views two steps in the installation process for a sleeve rivet. The installation here is shown with two metal layers 10 and 12 into which has been drilled a counterbored hole. The sleeve rivet will also find use in composite layer fastening with its corrosion problems and will use a corrosion resistant sleeve. The sleeve 15 has two separate portions. The first is the straight walled cylindrical portion 16 which flares out into the counterbored portion 17. The junction between the two is marked by the number 18. This is the critical oversized radius of the sleeve. This oversized radius will depend upon the installation. That is, it will be determined by the composition of the layer 10 which has the abutting sharp edge adjacent 18 and also by the diameter of the hole in layers 10 and 12. Nevertheless, the radius will normally fall within the dimensions of about 0.030" to about 0.040". The wall thickness of the sleeve used here is 0.016 inches although other, nonstandard sizes could be used. The hole itself is formed by first clamping of the layers 10 and 12 together, then drilling the straight hole through both layers and forming the counterbore in the upper layer 10. These steps have not been shown. After that the sleeve rivet assembly comprising the sleeve 15 and the rivet 14 is inserted into the hole to check the fit. If the fit is correct, as indicated by a relatively flush fit of the upper edge of the sleeve 13 against the top surface of layer 10, the rivet 14 will then be upset. In another embodiment, the rivets and sleeves could be separated and installed sequentially to achieve the interference fit. However, production rivetting tools such as Drivematics require that the sleeve and the rivet remain together as a unit. The upsetting operation is indicated by the force arrows 19. The upsetting forces will deform the tail end of the rivet as shown in FIG. 2. Here the tail end 22 of the rivet 14 has flared out. The upsetting of the rivet end also acts to deform the protruding portion of the sleeve 24 into the shape shown. The upsetting of the sleeve adjacent the edge of the hole 20 further acts to stress coin the sharp edge of the layer 12 in this region. This stress coining prestresses the edges of the hole to improve fatigue life at this area of layer 12.

Figure 3:
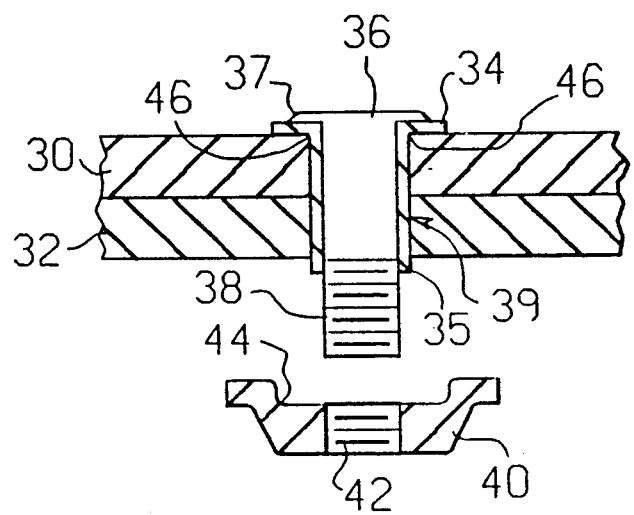
FIG. 3 is a cross sectional view of another embodiment of the invention in which a collared sleeve has been utilized and showing a stage in the method of installation of the fastener system comparable with FIG. 1 above in which the bolt has been driven into the sleeve but has not yet been clamped up.
Figure 4:
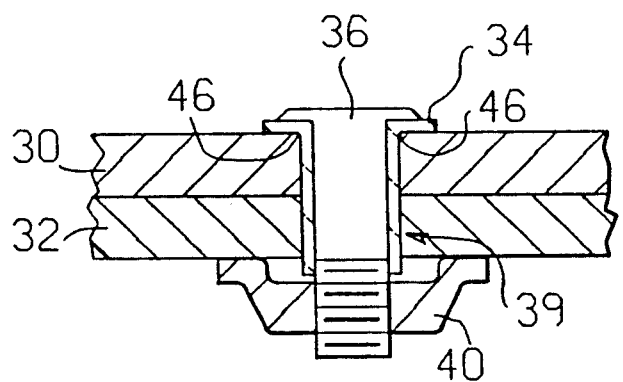
FIG. 4 is a cross sectional view showing a succeeding step of the installation shown in FIG. 3 in which the bolt has now been clamped up by the washer nut as shown.

FIGS. 3 and 4 illustrate a similar installation process for a collar sleeve which is used in conjunction with a bolt. This installation is also illustrated with two layers 30 and 32 although more layers could be present. Additionally, the layers are not limited to metal layers such as aluminum or steel or titanium but could also include graphites, fiberglass, carbon epoxy structural composite layers. This would also be the case for sleeved rivet installations as shown in FIGS. 1 and 2. The installation for this hole is simpler because it is a simple constant diameter hole formed perpendicular to the layers 30 and 32. The sleeve 39 is inserted into the hole to check for proper fit. Here the sleeve is a collar sleeve shown with the collar portion 34 and the cylindrical portion 35. The intersection of the two portions is illustrated by number 46 which has the oversized radius. The extent of the oversized radius will depend upon the composition of layer 30 and the diameter of the hole in layer 30 but will generally fall within the dimensions of from about 0.030" to about 0.040". Once the sleeve 39 has been slipped into the hole and its proper size has been verified, a bolt 36 is then driven into the sleeve as shown. The bolt has a head portion 37 and a threaded portion 38. The bolt is driven in a high interference fit of about 0.002 to 0.006 inches oversize in diameter relative to the inside diameter of the sleeve 39. The wall thickness of the sleeve here for this bolt application is a standard 0.032 inches although other non-standard thicknesses could be used. The interference fit of the oversize bolt 36 forces the sleeve 39 against the areas of the layers 30 and 32 which are adjacent to the sleeve. This general interference fit radially expands the adjacent portions of layers 30 and 32 to induce a residual group prestress in these regions which in turn increases the fatigue life of the bolted structure. In particular, the oversized radius at the region marked by number 46 stress coins this edge of the layer 30 to stress coin this region and also further increase the fatigue strength at this localized area. A counterbored nut 44 is also shown in this view. In FIG. 4 the nut 40 has been installed and torqued up against the bottom surface of layer 32. The layers 30 and 32 are now firmly clamped together by the bolt 36 and the nut 40 in conjunction with the sleeve 39.

Figure 5:
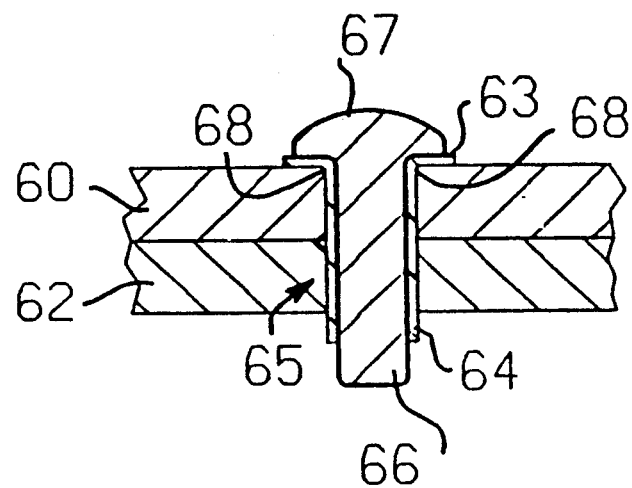
FIG. 5 shows another aspect of this invention in which a rivet is combined with a collared sleeve.

FIG. 5 shows a conventional domed head rivet 66 with the protruding head 67 as shown. It is installed in layers 60 and 62 in conjunction with a collar sleeve 65. As before in FIGS. 3 and 4, the collar sleeve comprises a collar portion 63 and a cylindrical portion 64 which intersect at region 68 in which an oversized radius is formed. After the sleeve has been inserted into the hole, its fit checked and verified, the rivet 66 is then driven into the hole from above in a high interference fit to radially expand the sleeve 65 against the adjacent regions of the layers 60 and 62, the oversized radius in the sleeve 65 at region 68 locally further stress coins the sharp edge of layer 60 to reduce the stress concentration effects and improve fatigue strength. In further steps of the installation the rivet 66 would be upset and deformed much in the manner shown in FIG. 2 for the counterbored flush head rivet. Alternatively, the installation can be done as described in conjunction with FIGS. 1 and 2.

Figure 6:
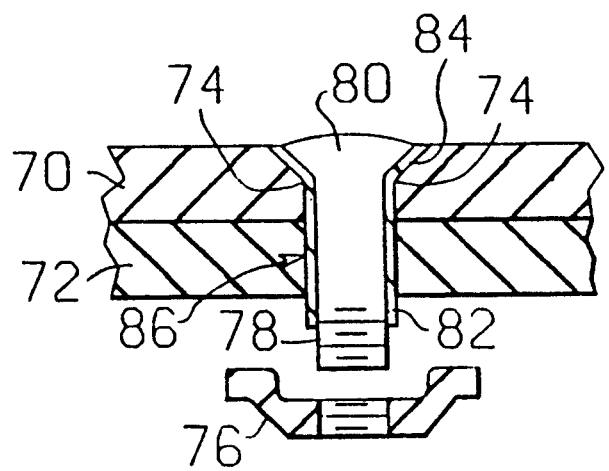
FIG. 6 is another aspect of the invention in which a bolt has been utilized in a counterbored hole as shown.

FIG. 6 shows a cross sectional view of the installation of a counterbore bolt 68 into layers 70 and 72. Here the sleeve 65 is a counterbore sleeve, having a counterbore portion 66 and a cylindrical portion 64 which intersect at the oversized radius region 74. At the point of the installation process shown in FIG. 6, the sleeve has already been inserted in a sliding fit into the counterbored hole, its fit has been checked and verified, the bolt 68 has been driven into the hole in a high interference fit, and the counterbore nut 72 is about to be threaded onto the threaded region 70 of the bolt 68. Once the nut 72 has been threaded on and torqued down onto the bottom surface of layer 72, the layers 70 and 72 will then be firmly fixed together in a manner similar to that shown in FIG. 4.

Figure 7:
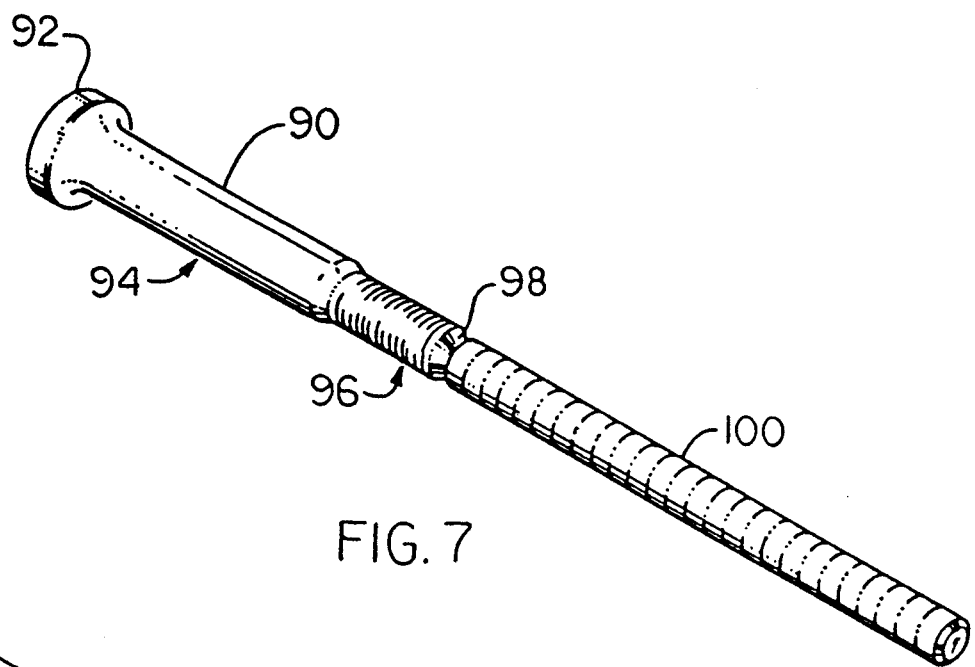
FIG. 7 is a side view of a hi-huck bolt alone.

FIG. 7 illustrates the hi-huck bolt. It has a head 92 and straight shaft portion 94. Shaft portion 94 is oversize relative to the hole to provide for the interference fit. The bolt reduces in diameter at threaded portion 96 which will later be received in a counterbored washer nut or a self aligning counterbored nut. The optional notch 98 will facilitate later breaking off of the serrated portion 100 which is grabbed by the huck installation tool, not shown, to pull the bolt into the sleeve within the hole.

Figure 8:
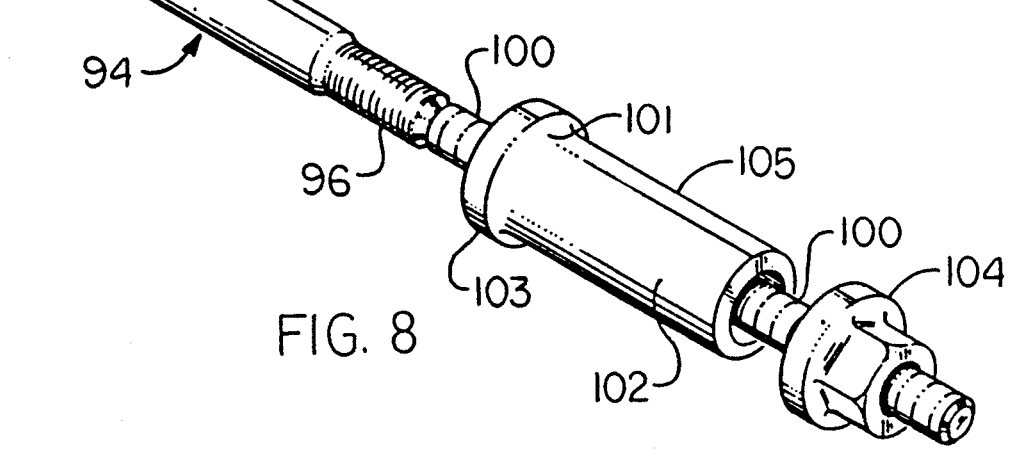
FIG. 8 is a side view of the hi-huck bolt in ensemble with its sleeve and counterbored nut.

FIG. 8 shows the hi-huck bolt as before with the addition of the sleeve 105 and the counterbored washer nut 104. The sleeve 105 has a collar 103 which joins the shank 102 at the specially radiused portion 101. This radiused portion corresponds in function and dimensions to the similar radiused portions in the preceding figures. For installation, the sleeve 105 would be slip fit into a hole and checked for correct size. The hi-huck bolt 90 would then be pulled into the sleeve by the huck tool and broken off at the notch 98. The counterbored washer nut 104 would then be torqued down on the threaded portion 96 to secure the fasteners.

In one test a counterbored flush head rivet such as that shown in FIGS. 1 and 2 was compared against a similar rivet without the sleeve. The prior art ¼" diameter rivet failed through the hole after 73,000 cycles. The ¼" diameter modified rivet similar to that shown in FIGS. 1 and 2 failed outside the hole after 5,000,000 cycles. These were for conditions of 30 KSI gross area stress and R=0.2. Other modified rivet specimens under the same conditions ran for 7,000,000 cycles. The test was stopped at this point with no specimen failure Sleeve bolts such as those shown in FIGS. 3, 4 and 6 are the only effective solution to obtain continuous interference fits through a stack up of different layers of aluminum, steel, titanium and composites combined together. Additionally, the sleeve bolts are able to adjust to differing hole tolerances in composite structural layers. Were this not the case, this would be cause for differential loading between adjacent fasteners in a multiple fastener installation. This in turn would concentrate the majority of the stress in the structure onto the highest loaded fastener, causing premature failure at this position. The use of the sleeve allows for elastic deformation of the sleeve and the fastener within the hole in the graphite composite structure. Since the sleeved fasteners are therefore able to elastically accommodate themselves to a more uniform stress condition than would be the case when non sleeved fasteners were to be used, a more uniform distribution of the stress between the fasteners can be achieved.

The following tables list typical installation clearances for the sleeves and the fasteners for different sized holes for a variety of layers of different compositions. All dimensions are in inches.

| SLEEVED RIVETS | | | |
|---|---|---|---|
| FASTENER DIAMETER | SLEEVE O.D. | SLEEVE I.D. AND RIVET DIAMETER | STRUCTURE HOLE DIAMETER |
| 3/16 | .190 | .156 | .192 |
|  | .187 |  | .198 |
| 7/32 | .226 | .187 | .229 |
|  | .223 |  | .235 |
| ¼ | .252 | .219 | .255 |
|  | .249 |  | .266 |

| SLEEVED BOLTS | | | | |
|---|---|---|---|---|
| FASTENER DIAMETER | SLEEVE O.D. | SLEEVE I.D. | CORE BOLT DIAMETER | STRUCTURE HOLE DIA. |
| 3/16 nom. | .1885 | .1575 | .1650 | .1895 |
|  | .1895 | .1585 | .1635 | .1915 |
| 3/16 2nd O.S. | .2175 | .1575 | .1650 | .2185 |
|  | .2185 | .1585 | .1635 | .2205 |
| ¼ nom. | .2485 | .1820 | .1895 | .2495 |
|  | .2495 | .1830 | .1880 | .2515 |
| ¼ 2nd O.S. | .2800 | .2420 | .2495 | .2810 |
|  | .2810 | .2430 | .2480 | .2830 |

What is claimed is:

1. A interference fit threaded pull bolt fastener system for use with a pull tool securing a plurality of layers having an aligned hole together comprising:

a bolt means comprising a straight walled shank portion having an enlarged head at one end and a threaded portion of a first reduced diameter at its other end with a serrated shaft means of diameter no greater than the first reduced diameter extending beyond the threaded portion, the serrated shaft being adapted to be broken off after pulling the bolt means into the hole;

a hollow sleeve means having a first portion adapted to receive the bolt means head, a straight walled portion of a smaller interior diameter than the exterior diameter of the shank of the bolt means adapted to receive the shank portion in an interference fit and a transition region of the outside surface of the sleeve at the intersection between the first portion and the straight walled portion wherein the transition region is a radiused intersection having a radius of about 0.030 to about 0.040 inches; and nut means adapted to be torqued onto the threaded portion of the bolt means.

* * * * *